United States Patent [19]

Natter

[11] 4,307,710
[45] Dec. 29, 1981

[54] SOLAR ENERGY COLLECTOR SYSTEM

[76] Inventor: Howard Natter, c/o Honatech, 179 Riverdale Ave., Yonkers, N.Y. 10705

[21] Appl. No.: 164,605

[22] Filed: Jun. 30, 1980

[51] Int. Cl.³ ............................................. F24J 3/02
[52] U.S. Cl. .................................. 126/440; 126/424
[58] Field of Search .............................. 126/438–440, 126/445, 446, 450, 424

[56] References Cited

U.S. PATENT DOCUMENTS

| | | | |
|---|---|---|---|
| 1,673,429 | 6/1928 | Vinson | 126/440 |
| 4,069,812 | 1/1978 | O'Neill | 126/440 |
| 4,149,523 | 4/1979 | Boy-Marcotte et al. | 126/438 |

FOREIGN PATENT DOCUMENTS

| | | | |
|---|---|---|---|
| 2394766 | 2/1979 | France | 126/440 |
| 2429976 | 2/1980 | France | 126/440 |

Primary Examiner—James C. Yeung
Attorney, Agent, or Firm—Natter & Natter

[57] ABSTRACT

A solar energy collector system having an array of solar concentrators mounted at spaced intervals along a conduit network through which a heat transfer fluid is circulated. The concentrators include an arcuate channel providing a heat absorption surface and a saddle member for mounting the channel section to the conduit. An insulation shroud surrounds the channel member and conduit. An elongate lens panel is positionable over the absorption surface for focusing incident solar radiation. The angle of inclination of the lens panel can be varied by manual rotation of the solar concentrators about the longitudinal axis of the conduit.

10 Claims, 4 Drawing Figures

SOLAR ENERGY COLLECTOR SYSTEM

BACKGROUND OF THE INVENTION

1. Field of the Invention

This invention relates to a solar energy collector system and especially to a system utilizing a distribution network for circulating a liquid heat transfer and storage medium.

In particular, the solar apparatus of this invention is concerned with an array of linear solar concentrators adapted for conduit mounting to provide variable angular inclination settings for directing incident solar radiation upon a curved energy absorption surface.

2. Description of the Prior Art

In view of the current energy crisis and the dramatic increase in utility costs, much attention has been directed to alternate energy sources with considerable emphasis upon solar technology. In response to this demand, solar energy systems were developed and incorporated into the basic construction of new homes, as well as in the retrofitting of existing heating systems.

Lack of widespread acceptance of many of the prior art solar heating systems was due in part to economic considerations. Another problem with previous solar collectors was that they were not readily adaptable for compatible use in many homes and buildings. Some solar panels, for instance, were designed with absorber plates and tubing which, when filled with water, added substantial weight to the roof deck. In addition to this live load, wind resistance and snow loading further increased the surcharge introduced by these solar collectors. As a result, structural reinforcement of the roof deck was frequently required.

Still other solar energy designs necessitated complex installation beyond the ability of the average homeowner or required substantial initial investments and constant or recurrent maintenance. Furthermore, the need for special tools, hardware and pipe fittings for some of these solar devices presented disadvantages to their practical implementation and discouraged more frequent acceptance by consumers.

The solar energy collector system of this invention, in contrast, utilizes linear solar concentrators which are fabricated of aluminum and plastic materials and are thus lightweight, can be readily handled for erection, and are comparatively simple to install without requiring any special roof reinforcement or elaborate support structure.

It is further contemplated that the instant solar energy collector can be manufactured and marketed either preassembled or in kit form and will be fully compatible for retrofitting with currently used, hydronic heating systems. Furthermore, the solar concentrator of this invention makes use of an arcuate absorption surface and adjustable mounting arrangement wherein the device of this invention can be installed on a horizontal, inclined or vertical surface and can still make maximum utilization of the sun's rays for solar heating.

An advantage of this invention over the prior art relates to the design of the solar concentrator including the incorporation of a lightweight insulation shroud surrounding the absorption surface and conduit to minimize heat loss.

A further improvement over previous solar devices concerns the use of a modified fresnel lens panel in the instant invention which also functions as a fastener for securing the insulation shroud.

It should be noted that a feature of this device is directed to the method of fabrication wherein the solar concentrator is formed of extruded aluminum and the insulation shroud is a plastic such as polypropylene or polycarbonate which can be extruded and thus provides a relatively inexpensive, cost efficient, and lightweight structure.

In view of the foregoing, it should be apparent that the present invention overcomes many of the shortcomings of the prior art devices and provides an improved solar energy collector system which eliminates many of the problems of the prior art.

SUMMARY OF THE INVENTION

Briefly, the nature of the solar energy collector system of this invention concerns a low cost, lightweight and easily constructed apparatus for concentrating solar radiation upon a matrix of copper tubing through which a heat transfer medium is circulated.

A plurality of linear solar concentrators are positioned over parallel connected segments of tubing. The tubing is supported in spaced relationship from a roof deck or other surface by support brackets. The solar concentrators are assembled for seating upon the tubing.

An elongate lens panel focuses the sun's rays upon a curved energy absorption surface of the concentrator. Heat is transmitted by conduction to the fluid within the tubing. The invention also encompasses the utilization of a bipartite insulation shroud for providing dead air cells around the energy absorption surface and tubing.

A feature of this invention relates to the design of the solar concentrator which combines an arcuate absorption surface and saddle member for rotatable mounting upon the tubing. It should thus be apparent that, since the lens inclination angle can be varied, the solar concentrator can be mounted on different surface orientations.

The lens panel includes a central section of uniform thickness with an increasing cross sectional thickness progressively toward the opposite edges. This arrangement tends to augment the focusing of light rays toward the arcuate absorption surface.

In addition, the solar concentrator can be rotatably displaced for focusing the sun's rays upon the absorption surface to achieve maximum efficiency. Another advancement incorporated in this device concerns the insulation shroud which is formed in two complementary half sections and is secured in position around the absorption surface and tubing by metal spring clamps on the underside and by the lens panel along the upper surface. In addition, screw fasteners can be used in place of or in addition to the metal spring clamps.

Another feature of this invention is that it is suitable for packaging and sale in kit form for do-it-yourselfers.

Having thus summarized the invention it will be seen that it is an object thereof to provide a solar energy collector system of the general character described herein which is not subject to the aforementioned disadvantages.

Specifically, it is an object of this invention to provide a solar energy collector system utilizing a circulating fluid within a conduit network and having an array of independent linear solar concentrators supported at intervals along the conduit for thermal transference to the fluid.

A further object of this invention is to provide a solar energy collector system having a plurality of solar concentrators, each provided with an elongate lens panel for concentrating solar radiation upon an arcuate energy absorption surface.

An additional object of the present invention is to provide a solar energy collector system wherein the solar concentrators are selectively rotatable about the conduits for changing the angular inclination to maximize incident solar radiation.

A still further object of this invention is to provide a solar energy collector system including a lightweight insulation shroud for minimizing heat losses during thermal exchange with the circulating fluid.

Yet another object of this invention is to provide a solar energy collector system of the general character described which is simple in construction, low in cost, reliable in use and well adapted for mass production fabrication techniques.

Other objects of the invention in part will be apparent and in part will be pointed out hereinafter.

With these ends in view, the invention finds embodiment in certain combinations of elements and arrangements of parts by which the aforementioned objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown a possible exemplary embodiment of the invention.

DESCRIPTION OF THE PREFERRED EMBODIMENT

Figure 1:
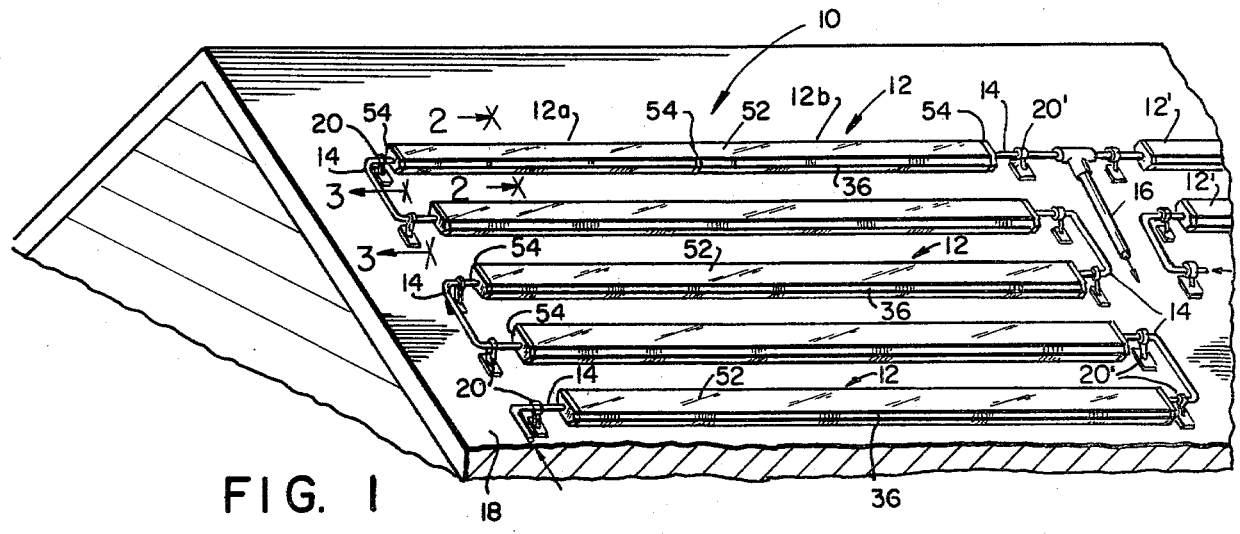
FIG. 1 is a perspective view of a solar energy collector system of this invention showing an array of linear solar concentrators on a pitched roof deck mounted upon a conduit network through which a heat transfer liquid is circulated in the directions typically indicated by the arrows.

Referring now in detail to the drawings, the reference numeral 10 denotes generally a solar energy collector system of this invention. The solar system 10 is illustrated in FIG. 1 in a typical installation upon a sloped roof deck of a dwelling house. As previously indicated, the solar system 10 is also adaptable for use within the purview of this invention upon horizontal or vertical surfaces.

With regard to this exemplary embodiment, a plurality of independent solar concentrators 12 are mounted in a parallel array upon a conduit network or tubular matrix 14. A companion array of solar concentrators 12' is partially shown in FIG. 1, and it should be understood that the number of solar concentrators 12, 12' in any particular array and the number of companion arrays can be varied in accordance with design requirements.

By way of background and for the purpose of further describing this invention, a conventional hydronic or liquid type solar heating system utilizes water and an antifreeze, e.g. ethylene glycol, as the working fluid which is circulated through the tubular matrix 14. Typically, a pump (not shown) is employed for circulating the heat transfer medium to a heat exchange storage tank (not shown) and for recirculating cold water through the solar collector. In addition, auxiliary heat sources, back-up systems, sensor circuits and control units are used in conjunction with the solar heating system as is known in the art.

Referring again to the conduit network or tubular matrix 14, it has been found that one-half inch I.D. copper tubing provides for satisfactory distribution for the working fluid and can be arranged in a serpentine pattern having linear segments for accepting the solar concentrators 12 as shown in FIG. 1. In this connection it should be noted that the copper tubing is compatible with standard plumbing hardware fittings and is adaptable for retrofitting existing hot water systems. The solar collector arrays further show the utilization of a common drain line 16 and similarly can be fed from a common manifold (not shown). The exposed curved segments of the tubular matrix 14 are wrapped or otherwise covered with a layer of insulation such as glass wool held in place by adhesive tape or the like.

Figure 3:
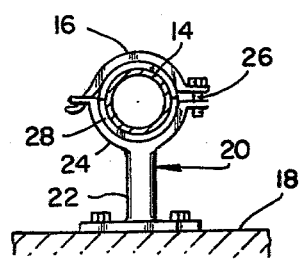
FIG. 3 is a sectional view to an enlarged scale taken substantially along line 3—3 of FIG. 1 illustrating a bracket fixed to the roof deck including an insulation sleeve and adjustable clamp for supporting the conduit with displacement compensation for expansion and contraction.

In regard to the installation of the solar system 10, the tubular matrix 14 is supported on a roof surface 18 at strategic locations at opposite ends of a straight section of tubing 14 by a pair of support brackets 20, 20' such as illustrated in FIG. 3. The direction of the circulating fluid is indicated by the arrows used in conjunction with the illustration of the tubular matrix 14. The bracket 20 has a pedestal portion 22 and a flared cradle segment 24 for receiving the tubing 14. a cover element 16 hingedly interfits with the cradle portion 24 at one end and is provided with a bolt and lock nut 26 at the opposite end for adjustably tightening over the tubing 14. In addition, an insulation sleeve 28 is provided both along the cover element 16 and the cradle portion 24 for reducing heat loss through the tubing 14. It should be noted that the aforementioned clamping arrangement for securing the tubing 14 is intended to provide required tolerances by the loosening of the bolt and wing nut 26 as needed for expansion and length extension upon heating or resultant contraction upon cooling of the tubing 14. In one preferred arrangement one of the two support brackets 20, 20' for each straight length of tubing 14 can be preloosened, however later adjustments can also be made as needed.

Figure 2:
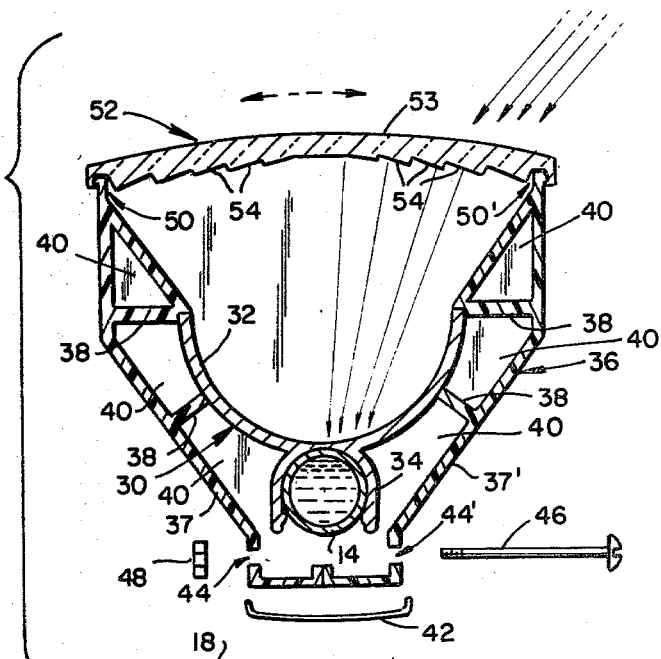
FIG. 2 is a sectional view to an enlarged scale of the linear solar concentrator taken substantially along line 2—2 of FIG. 1 illustrating a channel member forming an arcuate heat absorption surface, a saddle member for seating on the conduit and an insulation shroud; the refraction of incident light rays upon an elongate lens panel for concentration upon the absorption surface is denoted by the broken line arrows; in addition, the rotatable displacement of the solar concentrator about the longitudinal axis of the conduit is indicated by the double headed arrow.

The solar concentrator 12 will now be described in further detail with particular reference to FIG. 2. A typical solar concentrator 12 includes a channel member 30 having an arcuate absorption surface 32 and a U-shaped saddle portion 34 for snug engagement with the tubing 14. The channel member 30 can be formed of extruded aluminum or equivalent material; the aluminum, however, in conjunction with the copper tubing 14 provides a favorable coefficient of thermal conductivity for heat exchange. The arcuate absorption surface 32 is furthermore coated or painted with a heat absorbent material such as flat black paint. The saddle member 34 conforms generally to the outside diameter of the tubing 14 for intimate contact with the circular tube wall for effective heat conduction. The channel member 30 is further surrounded by a bipartite shroud 36 which can be fabricated of extruded plastic such as polypropylene, polycarbonate, etc. Alternatively, an injection molding process can be employed. The shroud 36 includes a plurality of ribs 38 extending to the surface of the channel member 30 for supporting the channel member 30 in spaced relation from the shroud 36 wherein a plurality of air cells or dead air spaces 40 insulate the channel member 30 and tubing 14 to reduce heat losses during transference.

The shroud 36 is constructed with two complementary half sections 37, 37' which are held together at its lower end by a plurality of metal spring clips 42 and further can be provided with aligned apertures 44, 44' for receiving a screw 46 adapted to be secured by a nut 48. The aforementioned fastening devices can be used individually or in combination at spaced intervals along the solar concentrator 12.

The upper edges of the complementary half sections 37, 37' are engaged by a longitudinal groove 50, 50' formed in an elongate lens panel 52. The lens panel 52 is generally formed of a plastic material having inherent flexibility for snap fitting engagement of the edges in the longitudinal grooves 50, 50'. The primary function, however, of the elongate lens panel 52 is to function as a transparent modified fresnel type lens for refracting incident solar radiation and concentrating the radiant energy upon the arcuate absorption surface 32. The lens 52, as shown in FIG. 2, has a convex outer peripheral surface 53 to facilitate rain and snow runoff. The interior surface is faceted or stepped to provide a plurality of parallel longitudinally extending zones 54 aggregatively corresponding to a generally convex lens. It should be noted that the cross sectional thickness of the lens 52 increases progressively from the central portion toward either side. This augments and achieves the desired bending of the light rays at the marginal edges and directs the rays toward the center of the arcuate surface 32 as typically denoted by the arrows showing incident radiation striking the lens 52 and absorption surface 32.

Figure 4:
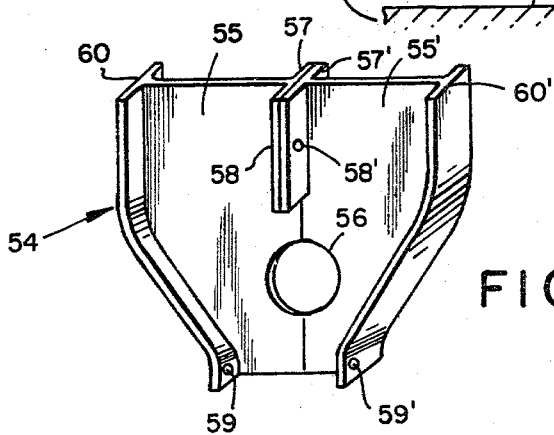
FIG. 4 is a perspective view to a slightly smaller scale of a closure plate for the solar concentrator such as illustrated in FIG. 2.

Reference is now made to FIG. 4 which shows, to a slightly reduced scale, a closure plate 54 for use with the solar collector 12. The purpose of the closure plate 54 is to seal the opposite open ends of the solar collector 12 and further to connect contiguous segments of solar collector 12 such as lengths 12a and 12b shown in FIG. 1. In order to position the closure plate 54 around tubing 14, the plate 54 is comprised of two half-sections 55, 55'. In addition, an aperture 56 permits passage of the tubing 14. The respective half-sections 55, 55' are also provided with a flange portion 57, 57' for securing the half-sections 55, 55' in the assembled mode as shown in FIG. 4. For this purpose, a screw fastener can be placed through aligned openings 58, 58' in the respective flange portion 57, 57' or other conventional clamp arrangements can be utilized. In addition, another pair of aligned openings 59, 59' are provided for the screw fastener 46 which will also pass through the apertures 44, 44'. It should also be noted that a pair of opposed lateral edges 60, 60' are dimensioned so as to overlap a portion of the shroud 36 for snug engagement therewith.

The preferred length of the solar collector 12 is approximately eight feet and can be assembled by joining several sections, as with the closure plates 54. The elongate lens panel 52 is approximately four inches in width and, as previously mentioned, is designed for capturing solar radiation and concentrating same upon the arcuate absorption surface 32 which has a surface area less than that of the lens panel 52. The space between the solar collectors 12 within an array in this exemplary embodiment is eight inches on center. This spacing arrangement provides, in alternating fashion, four inches of lens panel and four inches of roof deck to effectively provide a fifty percent coverage of the surface area. This array, in conjunction with the lightweight material from which the solar collectors 12 are fabricated provides a minimum increased weight to the roof deck and minimizes the surface area subject to wind and snow loading.

In operation, the solar energy collector system 10 of this invention is arranged such that the solar concentrators 12, 12' will lie in a generally east-west direction. The angle of inclination of the elongate lens panel 52 can also be varied by selective manual rotation of the solar concentrator 12, 12' about the longitudinal axis of the tubing 14. This is denoted by the double headed arrow in FIG. 2. Usually solar collectors are mounted at an angle from the ground of at least 10 degrees plus the latitude of their location. For example, in New York the angle of inclination of the lens panel 52 should be at a slope of at least 51 degrees from the horizon.

Thus, it will be seen that there is provided a solar energy collector system which achieves the various objects of the invention and which is well adapted to meet the conditions of practical use.

Since various possible embodiments might be made of the present invention and various changes might be made in the exemplary embodiments set forth, it is to be understood that all material set forth or shown in the accompanying drawings is to be interpreted as illustrative and not in a limiting sense.

Having thus described the invention, there is claimed as new and desired to be secured by Letters Patent:

1. A solar energy collector system comprising a tubular matrix for circulating a heat transfer medium, at least one solar concentrator mountable upon a length of tubing, said solar concentrator being formed of a channel member having an arcuate energy absorption surface, lens means for focusing solar radiation upon said absorption surface, seating means for engagement with said tubing, the seating means further including a saddle member extending below the absorption surface and positionable over the tubing whereby the solar concentrator can be rotatably displaced about the tubing for selective variation of the lens angle of inclination with respect to incident solar radiation, and insulation means including a shroud member secured in spaced relationship about the energy absorption surface and the tubing for minimizing heat losses.

2. A solar energy collector system as claimed in claim 1 wherein the shroud member includes a plurality of partition rib sections forming air insulating cells surrounding the absorption surface and tubing.

3. A solar energy collector system as claimed in claim 2 wherein the shroud member is comprised of complementary components adapted for securement along their upper edges by interfitting with the lens means and along their lower confronting edges by removable fastener means.

4. A solar energy collector system as claimed in claim 3 wherein the lens means includes an elongate lens panel, said lens panel defining longitudinal grooves extending along opposed margins, said grooves being adapted to receive the upper edges of the shroud components whereby the lens panel is positioned in confronting relationship with respect to the energy absorption surface.

5. A solar energy collector system as claimed in claim 4 wherein the lens panel has a cross-sectional thickness which increases progressively from a central portion toward either side of the panel for refracting solar rays on the absorption surface.

6. A solar energy collector system as claimed in claim 1 wherein the saddle member is formed integrally with the channel member as a U-shaped portion opening oppositely to the arcuate absorption surface and conforming generally to the outside diameter of the tubing for snug fitting engagement therewith.

7. A solar energy collector system as claimed in claim 1 further including a plurality of brackets for supporting the tubular matrix, said brackets being releasably adjustable to compensate for tubular expansion and length extension upon heating.

8. A solar energy collector system as claimed in claim 7 wherein the bracket further includes a cradle segment and a hingedly interfitting cover element which is adjustably tightenable over the tubing.

9. A solar energy collector system as claimed in claim 1 further including a closure plate, said closure plate being adapted for interfitting engagement with the opposite open ends of the shroud member.

10. A solar energy collector system as claimed in claim 9 wherein the closure plate is further adapted for securing contiguous aligned shroud members.

* * * * *